United States Patent
Gkoulalas-Divanis

(10) Patent No.: US 11,093,646 B2
(45) Date of Patent: *Aug. 17, 2021

(54) AUGMENTING DATASETS WITH SELECTED DE-IDENTIFIED DATA RECORDS

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,682

(22) Filed: Jun. 24, 2019

(65) Prior Publication Data

US 2019/0318125 A1    Oct. 17, 2019

Related U.S. Application Data

(63) Continuation of application No. 15/951,251, filed on Apr. 12, 2018.

(51) Int. Cl.
*G06F 21/62* (2013.01)
*G06F 21/60* (2013.01)

(52) U.S. Cl.
CPC ........ *G06F 21/6254* (2013.01); *G06F 21/604* (2013.01)

(58) Field of Classification Search
CPC .................... G06F 21/6254; G06F 21/604
See application file for complete search history.

(56) References Cited

U.S. PATENT DOCUMENTS 7,251,609 B1 * 7/2007 McAlindon ............ G06Q 50/24
                                                                         705/3
7,493,319 B1    2/2009 Dash et al.
(Continued)

FOREIGN PATENT DOCUMENTS

WO        2017205544 A1    11/2017

OTHER PUBLICATIONS

Webberley et al.; "Retweeting Beyond Expectation: Inferring Interestingness in Twitter", Computer Communications, vol. 73, Part B, Jan. 1, 2016, pp. 229-235.
(Continued)

*Primary Examiner* — Joseph P Hirl
*Assistant Examiner* — Thomas A Gyorfi
(74) *Attorney, Agent, or Firm* — Will Stock; Edell, Shapiro & Finnan, LLC

(57) ABSTRACT

A computer system utilizes a dataset to support a research study. Regions of interestingness are determined within a model of data records of a first dataset that are authorized for the research study by associated entities. Data records from a second dataset are represented within the model, wherein the data records from the second dataset are relevant for supporting objectives of the research study. Data records from the second dataset that fail to satisfy de-identification requirements are removed. A resulting dataset is generated that including the first dataset records within a selected region of interestingness and selected records of the second dataset within the same region. The second dataset records within the resulting dataset are de-identified based on the de-identification requirements. Embodiments of the present invention further include a method and program product for utilizing a dataset to support a research study in substantially the same manner described above.

6 Claims, 7 Drawing Sheets

(56) References Cited

U.S. PATENT DOCUMENTS

| | | | |
|---|---|---|---|
| 7,512,541 B2 | 3/2009 | Stroup et al. | |
| 7,519,591 B2 | 4/2009 | Landi et al. | |
| 7,711,580 B1* | 5/2010 | Hudson | G06F 19/324 |
| | | | 705/3 |
| 8,140,502 B2 | 3/2012 | Francis et al. | |
| 8,347,101 B2 | 1/2013 | Wilson | |
| 8,494,874 B2 | 7/2013 | Green, III et al. | |
| 8,880,532 B2 | 11/2014 | Shyr et al. | |
| 8,984,098 B1 | 3/2015 | Tomkins et al. | |
| 8,996,474 B2 | 3/2015 | Binkowski et al. | |
| 9,087,215 B2 | 7/2015 | LaFever et al. | |
| 9,118,641 B1 | 8/2015 | Paris, III | |
| 9,202,066 B2 | 12/2015 | Sinderbrand et al. | |
| 9,336,532 B1 | 5/2016 | Barton et al. | |
| 9,361,481 B2 | 6/2016 | LaFever et al. | |
| 9,619,669 B2 | 4/2017 | LaFever et al. | |
| 9,760,298 B2 | 9/2017 | Andrews et al. | |
| 9,760,718 B2 | 9/2017 | Braghin et al. | |
| 9,773,124 B2 | 9/2017 | El Emam et al. | |
| 9,779,077 B2 | 10/2017 | van den Broek | |
| 9,779,146 B2 | 10/2017 | Thatavarthy et al. | |
| 9,842,138 B2 | 12/2017 | Rabolt et al. | |
| 9,846,836 B2 | 12/2017 | Gao et al. | |
| 9,965,651 B1 | 5/2018 | Paris, III | |
| 10,043,035 B2 | 8/2018 | LaFever et al. | |
| 10,424,406 B2 | 9/2019 | Jafer et al. | |
| 10,454,901 B2 | 10/2019 | Kho et al. | |
| 10,566,082 B1 | 2/2020 | McNair | |
| 10,572,684 B2 | 2/2020 | LaFever et al. | |
| 10,622,101 B1 | 4/2020 | Dunlap et al. | |
| 2001/0051882 A1* | 12/2001 | Murphy | G16H 10/20 |
| | | | 705/3 |
| 2002/0000247 A1* | 1/2002 | Cusac | F02M 59/445 |
| | | | 137/375 |
| 2005/0256380 A1 | 11/2005 | Nourie et al. | |
| 2005/0273367 A1 | 12/2005 | Nourie et al. | |
| 2006/0059189 A1 | 3/2006 | Dunki et al. | |
| 2007/0118399 A1 | 5/2007 | Avinash et al. | |
| 2007/0233711 A1* | 10/2007 | Aggarwal | G06F 16/2465 |
| 2007/0245144 A1 | 10/2007 | Wilson | |
| 2010/0250285 A1 | 9/2010 | Shelton | |
| 2011/0112970 A1 | 5/2011 | Yu | |
| 2011/0258000 A1 | 10/2011 | Green, III et al. | |
| 2011/0264466 A1 | 10/2011 | Green, III et al. | |
| 2013/0304542 A1 | 11/2013 | Powell | |
| 2014/0289001 A1 | 9/2014 | Shelton | |
| 2015/0039611 A1 | 2/2015 | Deshpande et al. | |
| 2015/0128284 A1 | 5/2015 | LaFever et al. | |
| 2015/0128285 A1 | 5/2015 | LaFever et al. | |
| 2015/0128287 A1 | 5/2015 | LaFever et al. | |
| 2015/0161336 A1 | 6/2015 | Kalathil | |
| 2015/0339496 A1 | 11/2015 | El Emam et al. | |
| 2015/0379303 A1 | 12/2015 | LaFever et al. | |
| 2016/0085880 A1 | 3/2016 | Sheffer et al. | |
| 2016/0110523 A1* | 4/2016 | Francois | G06Q 50/24 |
| | | | 705/2 |
| 2016/0283745 A1 | 9/2016 | LaFever et al. | |
| 2016/0292455 A1* | 10/2016 | Jebara | G06F 16/9535 |
| 2017/0004594 A1 | 1/2017 | Gliklich et al. | |
| 2017/0046447 A1 | 2/2017 | Peng et al. | |
| 2017/0091388 A1 | 3/2017 | Zolla et al. | |
| 2017/0091412 A1 | 3/2017 | Johnson | |
| 2017/0091426 A1 | 3/2017 | Johnson | |
| 2017/0091686 A1 | 3/2017 | Goyal | |
| 2017/0103232 A1 | 4/2017 | Scaiano et al. | |
| 2017/0169252 A1 | 6/2017 | Ukena-Bonfig et al. | |
| 2017/0177907 A1* | 6/2017 | Scaiano | G06F 21/6254 |
| 2017/0208041 A1 | 7/2017 | Kho et al. | |
| 2017/0243028 A1 | 8/2017 | LaFever et al. | |
| 2017/0255790 A1 | 9/2017 | Barrett et al. | |
| 2017/0286556 A1 | 10/2017 | Chan et al. | |
| 2017/0301041 A1 | 10/2017 | Schneider | |
| 2017/0351845 A1 | 12/2017 | Poppa et al. | |
| 2018/0018590 A1 | 1/2018 | Szeto et al. | |
| 2018/0046753 A1 | 2/2018 | Shelton | |
| 2018/0060982 A1 | 3/2018 | Milles et al. | |
| 2018/0082022 A1 | 3/2018 | Francois | |
| 2018/0092595 A1 | 4/2018 | Chen et al. | |
| 2018/0182470 A1 | 6/2018 | Kalathil | |
| 2018/0307859 A1 | 10/2018 | LaFever et al. | |
| 2018/0323980 A1 | 11/2018 | Ahn et al. | |
| 2018/0365317 A1 | 12/2018 | Chong et al. | |
| 2019/0096511 A1 | 3/2019 | Longmire et al. | |
| 2019/0147989 A1 | 5/2019 | Giusti et al. | |
| 2019/0156927 A1 | 5/2019 | Virkar et al. | |
| 2019/0188410 A1 | 6/2019 | Briscoe et al. | |
| 2019/0205507 A1 | 7/2019 | Antonatos et al. | |
| 2019/0244683 A1 | 8/2019 | Francois | |
| 2019/0304575 A1 | 10/2019 | Beltre et al. | |
| 2019/0311788 A1 | 10/2019 | Beltre et al. | |
| 2019/0318124 A1 | 10/2019 | Gkoulalas-Divanis | |
| 2019/0318809 A1 | 10/2019 | Gkoulalas-Divanis et al. | |
| 2019/0318810 A1 | 10/2019 | Gkoulalas-Divanis et al. | |
| 2019/0318811 A1 | 10/2019 | Gkoulalas-Divanis | |
| 2019/0318813 A1 | 10/2019 | Gkoulalas-Divanis | |
| 2019/0332807 A1 | 10/2019 | LaFever et al. | |

OTHER PUBLICATIONS

Tsai et al.; "Person-Specific Domian Adaptation With Applications to Heterogeneous Face Recognition", ICIP IEEE International Conference on, Oct. 27-30, 2014, pp. 338-342.

Nelson, S. Gregory; "Practical Implications of Sharing Data: A Primer on Data Privacy, Anonymization, and De-Identification", ThotWare Technologies, Mar. 28, 2015, pp. 1-23.

Garfinkel, L. Simson; "De-Identification of Personal Information", U.S. Department of Commerce, National Institute of Standards and Technology, Oct. 30, 2015, pp. 1-54.

Bernard et al.; "Visual-Interactive Exploration of Interesting Multivariate Relations in Mixed Research Data Sets", EuroVis Conference on, vol. 33, Issue 3, Jun. 2014, pp. 291-300.

Rabkin et al.; "A Graphical Representation for Identifier Structure in Logs", SLAML'10 ACM Workshop on, Oct. 10, pp. 1-9.

Christopher et al.; "Knowledge-Based Systems and Interestingness Measures: Analysis With Clinical Datasets", CIT Journal of, vol. 24, No. 1, Mar. 2016, pp. 65-78.

Sahar, Sigal; "What Is Interesting: Studies on Interestingness in Knowledge Discovery", Tel-Avis University, Doctoral Dissertation, Mar. 2003, pp. 1-200.

"Use of Patient Information for Single Case Studies and Journal Publication", hipaa@u.washington.edu, UW Medicine Compliance, 2014, 1 page.

Black, "Temporal Data Mining in Electronic Medical Records from Patients with Acute Coronary Syndrome", University of Washington, 2013, 113 pages.

Anonymously, "A Method and System for Storing and Viewing Patient Medical Images in a Personal Health Record Store", http://ip.com/IPCOM/000251246D, Oct. 26, 2017, 5 pages.

Anonymously, "Universal Blockchained Health Record", http://ip.com/IPCOM/000245863D, Apr. 13, 2016, 3 pages.

Anonymously, "A Method and System for Automatically Selecting Patient Cohorts from Electronic Health Records using Flexible Search and an Automatic Longitudinal Patient Record Formation", http://ip.com/IPCOM/000241430D, Apr. 25, 2015, 6 pages.

"Data De-identification and Anonymization of Individual Patient Data in Clinical Studies—A Model Approach", Transcelerate BioPharma Inc., 2013, 15 pages.

List of IBM Patents or Patent Applications Treated as Related, Nov. 2018, 1 page.

List of IBM Patents or Patent Applications Treated As Related, filed Jun. 24, 2019.

* cited by examiner

AUGMENTING DATASETS WITH SELECTED DE-IDENTIFIED DATA RECORDS

BACKGROUND

1. Technical Field

Present invention embodiments relate to controlling data access by creating datasets that contain data provided by entities with their consent, and more specifically, to augmenting such datasets with de-identified data of other entities.

2. Discussion of the Related Art

Research studies may require the collection and analysis of large volumes of personal data from many entities. To obtain personal data, researchers may ask individuals for their consent to share their data for a stated purpose, such as for conducting a particular medical study. Individuals who agree to provide their personal data may conditionally consent to sharing only a subset of their personal data, may consent to share their data at a particular level of granularity (e.g., the year of birth instead of the date of birth), and/or stipulate that their personal data be used for limited purposes only.

Often, it is difficult to find enough participants who are willing to contribute their personal information for conducting a study. In order to create larger and richer datasets, which are usually necessary to allow for important research conclusions to be drawn, researchers may desire to include data from elsewhere in a manner that is likely to supports the study.

SUMMARY

According to one embodiment of the present invention, a computer system utilizes a dataset to support a research study. One or more regions of interestingness are determined within a model of data records of a first dataset, wherein the data records of the first dataset are authorized for the research study by associated entities. Data records from a second dataset are represented within the model, wherein the data records from the second dataset are relevant for supporting objectives of the research study, correspond to entities other than those associated with the first dataset, and are authorized for the research study by associated entities after transformation to satisfy de-identification requirements. Data records from the second dataset are removed from the one or more regions of interestingness based on those records failing to satisfy the de-identification requirements. A resulting dataset is generated for the research study including the data records of the first dataset within a selected region of interestingness and selected data records of the second dataset within the selected region of interestingness. The data records of the second dataset within the resulting dataset are de-identified based on the de-identification requirements. Embodiments of the present invention further include a method and program product for utilizing a dataset to support a research study in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to controlling data access by creating datasets for research that contain data provided by individuals with their consent, and more specifically, to augmenting such datasets with de-identified data involving other data subjects. In general, research studies benefit from larger samples of data. However, it may be difficult for researchers to find enough entities (e.g., individuals, groups of individuals, business entities, etc.) whose data is appropriate for a particular study and who are also willing to participate in the study by providing their personal data. At the same time, many other entities have made their personal data available to be used for any purpose, as long as the data is sufficiently de-identified first so that the individuals can remain anonymous. By augmenting the smaller datasets composed of consenting participants' data with data provided for any purpose in general, larger and richer datasets may be generated for particular research purposes. Thus, present invention embodiments enable otherwise-restricted data records to be used in studies, thereby greatly enriching research datasets by increasing the overall volume of records that are available for analysis.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
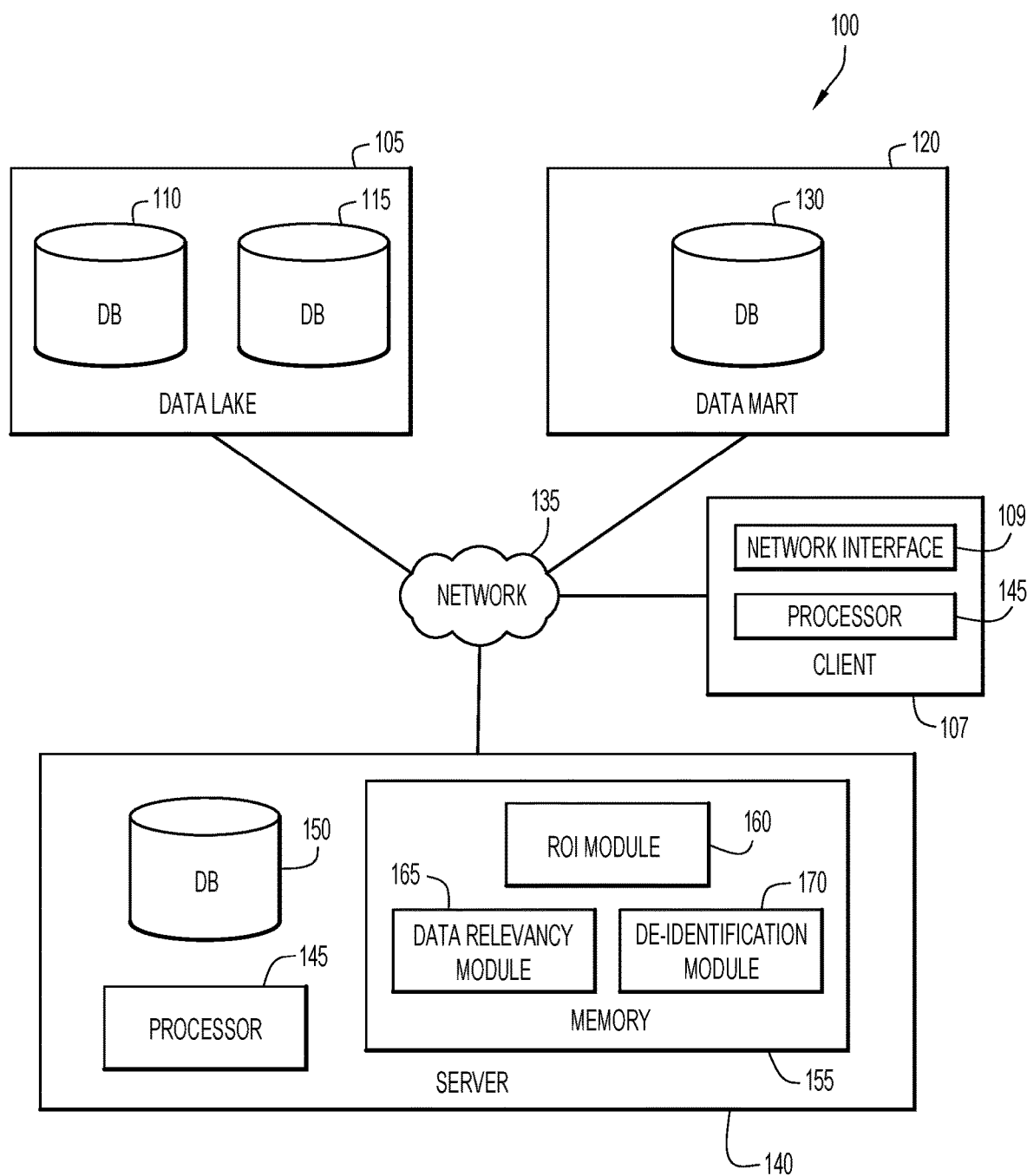
FIG. 1 is a block diagram depicting a computing environment for generating datasets in accordance with an embodiment of the present invention.

Present invention embodiments will now be described in detail with reference to the Figures. FIG. 1 is a block diagram depicting a computing environment 100 for generating datasets in accordance with an embodiment of the present invention. As depicted, computing environment 100 includes a data lake 105 with databases 110 and 115, a data mart 120 with a database 130, a network 135, a client 107, and a server 140. The server 140 includes a processor 145, a database 150, memory 155, a region-of-interestingness module 160, a data relevancy module 165, and a de-identification module 170. Computing environment 100 may enable the combination of datasets involving personal data provided from participants who consented to the data's use for limited research purposes, with datasets involving personal data provided by individuals in order to be used for any purpose after they have been properly de-identified.

Data lake 105 may store personal data in one or more databases, such as database 110 and database 115. Data lake 105 may include storage repositories that contain amounts of raw data in their native format(s). Data lake 105 may store data according to a flat (rather than hierarchical) architecture. Database 110 may store personal data that entities have provided for one or more specific purposes, such as for inclusion in a particular medical study. Access control information, which states the specific purpose(s) for which the data may be used and the level of detail that is permitted, may also be stored along with the specific-purpose data. Database 115 may store personal data that individuals have provided for general use toward any research purpose, as long as the data is de-identified prior to use. Since data lake 105 may store original data that has not been de-identified or anonymized, data lake 105 may be subject to various data security regulations. For example, data lake 105 may be maintained in a secure storage environment that is in compliance with Health Insurance Portability and Accountability Act (HIPAA) security requirements.

Data mart 120 may store data that is organized in support of a particular research purpose. In some embodiments, data mart 120 enables users to access one or more datasets that have been augmented with de-identified data. Data mart 120 may store each dataset on database 130. A dataset stored on database 130 may include data records of individuals who have consented to their personal data being used for a particular purpose (i.e., the purpose toward which data mart 120 is organized), along with de-identified data that supplements the personal data.

Network 135 may include a local area network (LAN), a wide area network (WAN) such as the Internet, or a combination of the two, and includes wired, wireless, or fiber optic connections. In general, network 135 can be any combination of connections and protocols that will support communications between data lake 105, data mart 120, client 107, and/or server 140 in accordance with embodiments of the present invention.

Client 107 includes a network interface 109 and a processor 145. In various embodiments of the present invention, client 107 may include a laptop computer, a tablet computer, a netbook computer, a personal computer (PC), a desktop computer, a personal digital assistant (PDA), a smart phone, a thin client, or any programmable electronic device capable of executing computer readable program instructions. Client 107 may include internal and external hardware components, as depicted and described in further detail with respect to FIG. 4. A user, such as a data owner, may use client 107 to access and manage databases, such as database 110, 115, and 130, as well as create augmented datasets in accordance with embodiments of the present invention.

In general, server 140 and its modules may analyze data provided by individuals for a specific purpose, identify additional general-purpose data that can augment the specific-purpose data, and produce new datasets by merging the specific-purpose data with a subset of the general-purpose data in accordance with access control information. Server 140 may retrieve specific-purpose data from database 110 and general-purpose data from database 115 via network 135. In some embodiments, server 140 stores the retrieved specific-purpose data and/or general-purpose data locally in database 150. At least one processor, such as processor 145, executes the instructions of the modules stored in memory 155. Server 140 may include internal and external hardware components, as depicted and described in further detail with respect to FIG. 5.

Region-of-interestingness (ROI) module 160 may identify particular regions of interestingness in the specific-purpose data. ROI module 160 may find regions of interestingness by looking for records that are statistically correlated as determined according to conventional or other techniques. For example, ROI module 160 may identify regions of interestingness by identifying data records that are clustered together, or that can be partitioned into the same region together according to one or more rule sets. A region of interestingness may be the result of applying a particular query to the specific-purpose data.

In some embodiments, the utility requirements of a study create parameter constraints that restrict where ROI module 160 may locate regions of interestingness. For example, if a study is researching the effects of diabetes on individuals over thirty years of age, then ROI module 160 may omit from consideration any records or regions whose age value is below thirty. This also ensures that ROI module 160 does not identify a cluster of records that contains individuals that are below and above thirty years of age as a region of interestingness, since such a region of interestingness would violate the utility requirements of the study, leading to inaccurate findings.

Data relevancy module 165 may analyze general-purpose data to identify a subset of records that can be used to support the purpose of the specific-purpose data, and also fall within one or more regions of interestingness identified by ROI module 160. Furthermore, data relevancy module 165 may perform de-duplication by excluding any records in the general-purpose data that are also represented in the specific-purpose data.

De-identification module 170 may apply one or more data de-identification techniques to the general-purpose data in order to conceal direct identifiers and quasi-identifiers, thereby protect the corresponding individuals from re-identification attacks. Direct identifiers, also known as personal identifiers, may immediately identify entities without requiring any other information. For example, direct identifiers may include a full name, social security number, telephone number, email or residential address, or other national identifiers. Quasi-identifiers are pieces of information that alone are not sufficient to re-identify an individual, but in combination with other features of the data may provide sufficient information to enable an attacker to uniquely identify an entity. Thus, quasi-identifiers can indirectly identify an individual. For example, the combination of the five-digit zip code where a person lives, together with gender information and the date of birth of the individual, have been shown to be sufficient information to re-identify a large portion of the population of the United States. By performing various de-identification techniques, de-identification module 170 can ensure that a resulting dataset will be in compliance with particular privacy regulations or standards. De-identification module 170 may output de-identified data to storage 150 or to storage 130 of data mart 120. In some embodiments, de-identification module 170 parallelizes the de-identification of records. For example, records of non-consented individuals who participate in the regions of interestingness may be de-identified in parallel. When records are de-identified at the same time, the overall time that the records occupy system memory is reduced, as well as the amount of time required by the de-identification process.

Databases 110, 115, 130, and 150 may include any non-volatile storage media known in the art. For example, databases 110, 115, 130, and 150 can be implemented with a tape library, optical library, one or more independent hard disk drives, or multiple hard disk drives in a redundant array of independent disks (RAID). Similarly, data on databases 110, 115, 130, and 150 may conform to any suitable storage architecture known in the art, such as a file, a relational database, an object-oriented database, and/or one or more tables.

Figure 2:
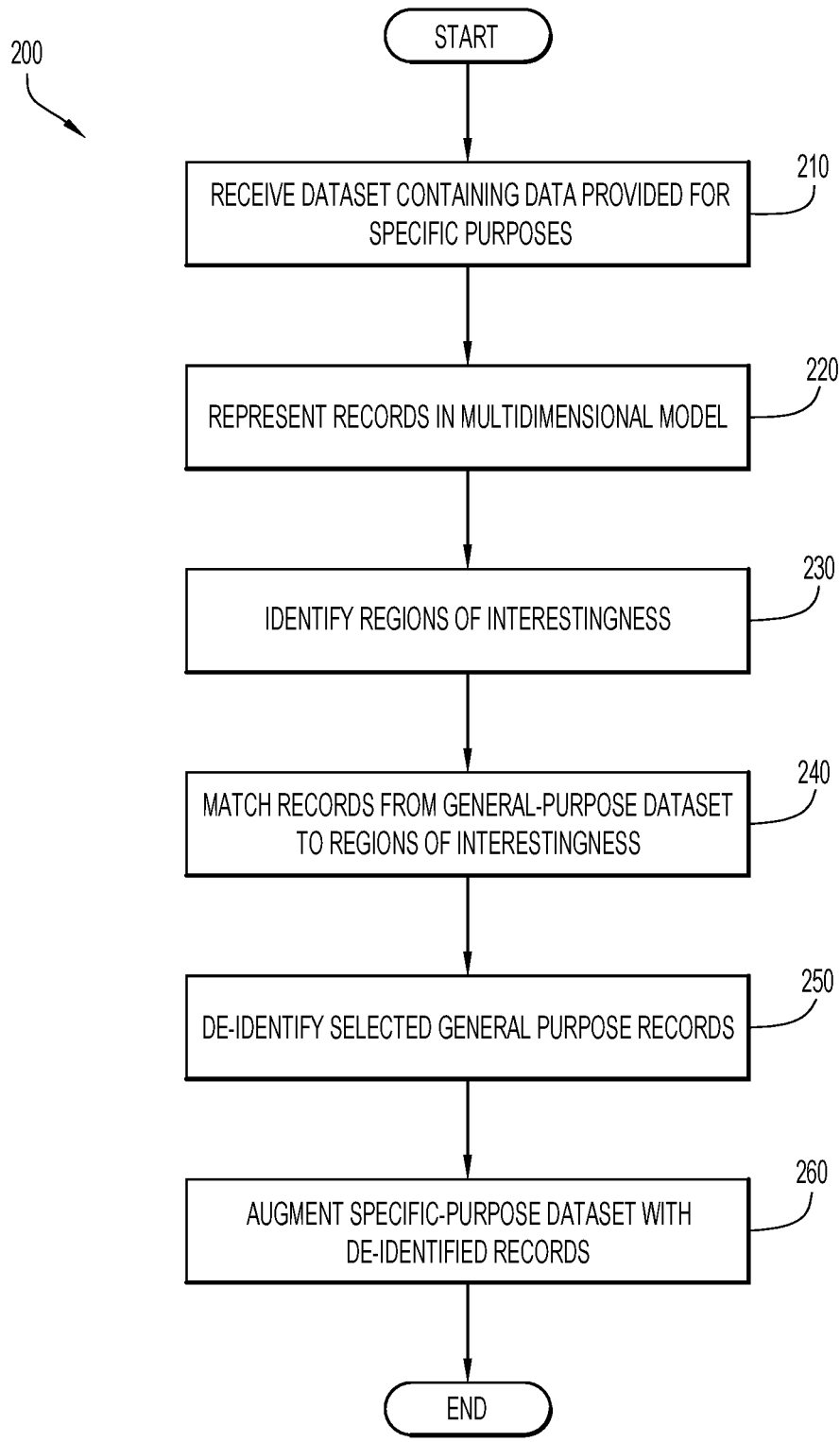
FIG. 2 is a flow chart depicting a method of generating a dataset in accordance with an embodiment of the present invention.

FIG. 2 is a flow chart depicting a method of generating a dataset in accordance with an embodiment of the present invention.

A dataset containing individuals' personal data that was provided for a specific purpose is received at operation 210. The specific-purpose data records may be received by ROI module 160 from database 110 of data lake 105 or may be received from database 150. Metadata that describes the level of granularity at which an individual has agreed to share their data may accompany the specific-purpose data.

This specific-purpose data is obtained from individuals who have consented to its use for one or more particular purposes. For example, individuals may consent to the use of any of their health data for the purpose of conducting cardiovascular-related research. Individuals may also control the level of granularity at which they consent to their personal data's use. For example, individuals may provide consent to providing only their blood pressure data, only their heart rate data, only the zip code where they live, etc., toward a cardiovascular-related research study.

Granularity levels may be hierarchical; for example, individuals may consent to providing their birth date, or their month and year of birth, or only their birth year. In one embodiment, individuals exert control over the level of granularity according to the number of digits of a medical diagnosis code that are provided. When all of the digits of a diagnosis code are provided, the highest level of specificity for a medical condition is known; if some digits of a code are omitted, a condition may be described more broadly and with less detail. For example, a full diagnosis code may describe a specific type of nearsightedness, a partial diagnosis code may describe nearsightedness in general (e.g. a family of related conditions), and an even more incomplete diagnosis code may simply indicate a reference to a vision disorder. Individuals may also consent to the use of any direct identifiers or quasi-identifiers included in their personal data.

The specific-purpose data records are represented in a multidimensional model at operation 220. Each dimension of a multidimensional model may correspond to a particular quasi-identifier. For an example using the quasi-identifiers of age and gender, a two-dimensional model may be constructed with one axis corresponding to age and the other axis corresponding to gender. Specific-purpose records may then be represented according to each individual's age and gender information in the multidimensional model. In some embodiments, ROI module 160 constructs a multidimensional model for a specific-purpose dataset and migrates the data to the model. A multidimensional model may have three or more dimensions. In some embodiments, each dimension of a multidimensional model corresponds to one quasi-identifier field of the specific-purpose dataset. Thus, a multidimensional model uses quasi-identifiers as constraints by which individual records are organized in order to identify regions of interestingness.

Regions of interestingness are identified at operation 230. Each region of interestingness may correspond to a grouping of records in the multidimensional model that are correlated in some manner. Instead of constructing a multidimensional model and representing records in the model, ROI module 160 may identify regions of interestingness by directly analyzing the underlying dataset using quasi-identifiers as constraints to find records that are statistically related to each other or clustered together. ROI module 160 may correlate regions of interestingness to a study by factoring in the utility requirements of a study. For example, if a study is researching a particular disease with respect to age, then ROI module 160 may divide records into five-year intervals, and only identify clusters of records as regions of interestingness when those clusters do not violate (e.g. overlap) any divisions between five-year intervals.

In some embodiments, regions of interestingness may be identified using information related to the purpose or goal of a research study. For example, if the purpose of a genome-wide association study is to look into a particular relation between diagnosis codes and single nucleotide polymorphisms, then the attributes of diagnoses codes and gene sequences should be considered when identifying regions of interestingness. However, if the purpose of a research study does not indicate potential patterns in the data that could lead to the identification of regions of interestingness, then regions of interestingness may nevertheless be identified according to similarities that exist among the various attributes of the data records. For example, regions of interestingness may be identified by searching for data records that are clustered together, or by performing frequent item-set mining to capture records supporting the same item-sets (e.g., patterns). Specific data mining or statistical analysis algorithms may identify regions of interestingness that are relevant to the task that the overall dataset is being used to support (e.g., identify regions of interestingness using clustering data if the dataset is planned to be used for clustering purposes, discover outliers if part of the dataset's planned use involves outliers, etc.).

In one embodiment, regions of interestingness are identified by representing the specific-purpose data records as a multidimensional model with each dimension corresponding to a quasi-identifier. Next, the data is processed by one or more data analysis algorithms, such as data clustering algorithms, data classification algorithms, association rule mining algorithms, and/or any algorithms that are considered to be similar to the ones that will be used for conducting the research study, that are relevant to a purpose that needs to be supported by the data. In some embodiments, the data analysis algorithm is similar to (or identical to) an algorithm that will eventually be applied to a dataset resulting from the union of the specific-purpose data and the subset of the general-purpose data. While the algorithm processes the data, a monitoring service (such as data relevancy module 165) monitors the algorithm to determine how the algorithm processes the dataset to support the intended type of analysis; regions of interestingness can be extracted based on observation of the algorithm. For example, if it is known that a certain algorithm will be applied to the resulting dataset (e.g., a dataset that includes the specific-purpose data and the subset of the general-purpose data that is relevant), then that algorithm may be applied to the specific-purpose data only, and by determining which records the algorithm processes together, regions of interestingness may be identified to support this processing. Furthermore, utility constraints may be derived, which correspond to regions of interestingness that must be preserved in order to support the purpose of the dataset. The utility constraints may serve as guidelines to ensure that data records will support the intended purpose of a study after the records are de-identified.

Data records that individuals have provided for general use are matched to regions of interestingness at operation 240. Data relevancy module 165 may evaluate each general-purpose record to determine a record's relevancy to any of the regions of interestingness of the specific-purpose data. Prior to matching the general-purpose data to regions of interestingness, some records of the general-purpose data may be excluded. Data relevancy module 165 may avoid duplicate records by excluding any records in the general-purpose data that are also represented in the specific-purpose data. Any records in the general-purpose data that do not support the purpose of the specific-purpose dataset may also be excluded. For example, if the specific-purpose dataset contains data that is provided for the purpose of studying a certain disease in a particular country, then any records in the general-purpose dataset that do not include that disease and country may be excluded. By excluding records prior to matching the general-purpose data to the regions of interestingness, execution of operation 240 may require less processing time.

Records in the general-purpose data may be matched to regions of interestingness by determining whether a record would fall into a region of interestingness if the record was included in the specific-purpose dataset. In some embodiments, one or more similarity metrics are applied to compare records in the general-purpose data to specific-purpose data records of a region of interestingness; if a general-purpose record meets or surpasses the threshold, the record may be considered to be relevant. Thus, data relevancy module 165 selects a subset of the general-purpose data that is relevant to include with the specific-purpose dataset.

The subset of general-purpose records that has been determined to be relevant are de-identified at operation 250. In some embodiments, de-identification module 170 de-identifies the subset of general-purpose data by removing direct identifiers and quasi-identifiers. De-identification may be performed on records that lie within a particular region of interestingness; records should not be de-identified across regions because doing so may obscure underlying patterns in the specific-purpose data that may be of interest to researchers. De-identification may be achieved by generalizing records to achieve k-anonymity, or any other formal privacy model. Records that cannot be de-identified via generalization (e.g., if there not are at least k−1 other records in a region) may be suppressed or removed.

In some embodiments, the subset of general-purpose records are de-identified in parallel. For example, the regions of interestingness may be de-identified in parallel. Typically, the data records are processed as a single group, thereby providing serial de-identification of the data records. However, when plural regions of interestingness are identified, the plural regions may be processed in parallel. When de-identification operations are parallelized, all of the selected general-purpose records may be de-identified at the same time, thereby reducing the amount of time that the general-purpose records occupy system memory and reducing the overall amount of time required to perform de-identification.

De-identification module 170 may de-identify the selected general-purpose records according to the requirements of a particular legal privacy framework (e.g., Health Insurance Portability and Accountability Act (HIPAA) Safe Harbor, HIPAA Expert Determination, General Data Protection Regulation (GDPR) pseudonymization, GDPR anonymization, etc.), or by general data de-identification approaches. Forms of de-identification may include data generalization, data suppression, data masking, support of a formal privacy model such as k-anonymity, 1-diversity, $p_1$-to-$p_2$ privacy, ε-differential privacy, $k^m$-anonymity, set-based anonymization, relational-transactional (RT) anonymity, or any other data de-identification methodology or combination thereof.

Records can also be micro-aggregated to provide definite values instead of intervals. In micro-aggregation, an aggregate value may be calculated for a quasi-identifying attribute of multiple records; the aggregate value may then be used instead of individual records' values. For example, if a record R1 corresponds to an individual who is 20 years old, and another record R2 corresponds to an individual who is 30 years old, then the aggregate value may be the arithmetic mean of the age values, or 25 years old. By applying micro-aggregation, the numerical values of records are replaced with a mean value. Furthermore, for categorical attribute values, the median value of a set of records sorted by attribute may replace the individual records' values. If a sorting order cannot be imposed on the categorical values of an attribute, the frequency of each value of the categorical attribute in a cluster may be calculated, and a value may be randomly selected among those that have the highest frequencies of appearance.

During the de-identification operation 250, synthetic data records may be produced by creating empty records and populating the records with values based on noisy aggregate values computed from the original dataset. Noisy aggregate values may be produced by injecting noise into aggregate values to account for privacy protection. In some embodiments, independently-generated random noise (e.g., following a data distribution such as a Laplace distribution) is introduced to the correct values of records. For example, if there are three individuals in a dataset who are below forty years of age, a function that counts the number of individuals under forty would calculate a value of three; in contrast, a function that produces a noisy value would insert noise drawn from a Laplace distribution, producing a value of 3±Laplace(1/ε), with ε representing a privacy parameter that quantifies the privacy risk of releasing statistics computed using the sensitive data. A lower the value of ε corresponds to a higher level of privacy (and a lower utility) of the noisy value that is produced.

A new dataset is generated by augmenting the specific-purpose dataset with a de-identified subset of the general-purpose records at operation 260. The augmented dataset may support the same purpose as the specific-purpose dataset, but since the augmented dataset is larger, it may provide greater utility to researchers. The augmented dataset may be produced by server 140 performing a union operation on the specific-purpose dataset and the de-identified subset of the general-purpose data. The augmented dataset may be output to database 150. In some embodiments, the augmented dataset is stored in database 130 of data mart 120. Researchers may access data mart 120 in order to conduct research for the particular purpose that is supported by the augmented dataset.

FIGS. 3A-3D illustrate an example of dataset generation in accordance with an embodiment of the present invention.

Figure 3A:
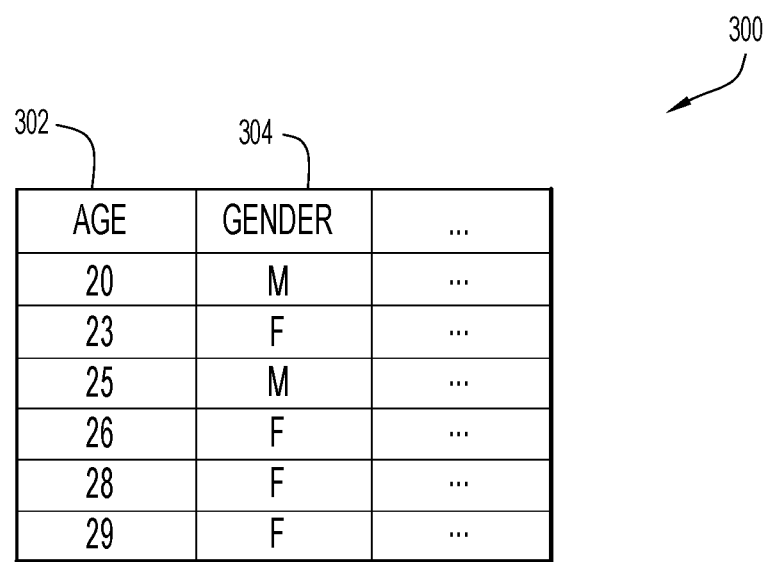
FIGS. 3A-3D illustrate examples of dataset generation in accordance with an embodiment of the present invention.
Figure 3B:
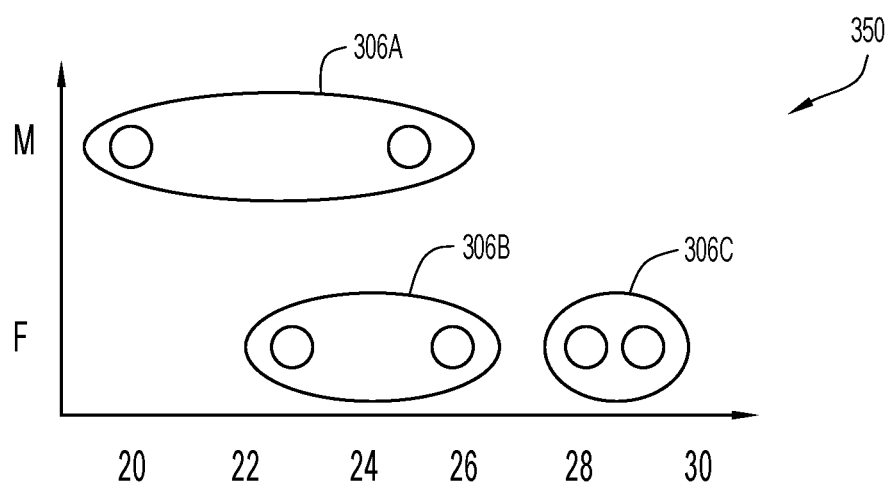
Figure 3C:
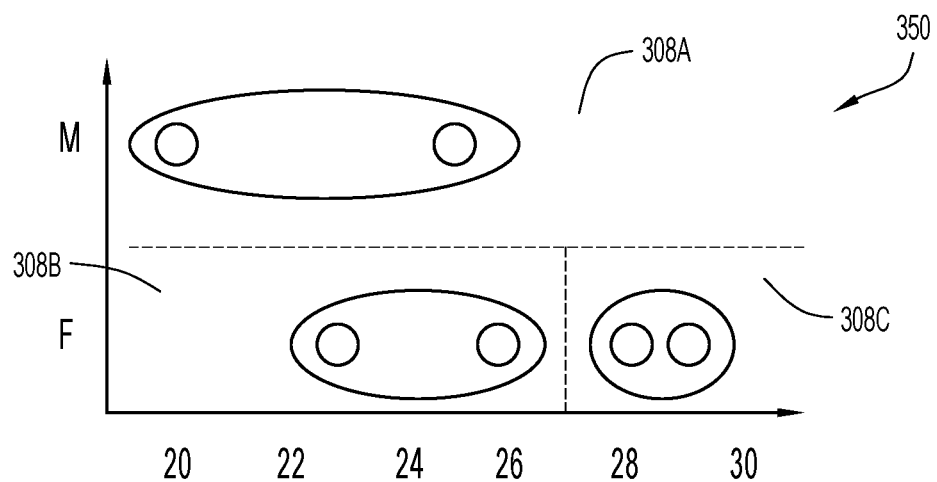
Figure 3D:
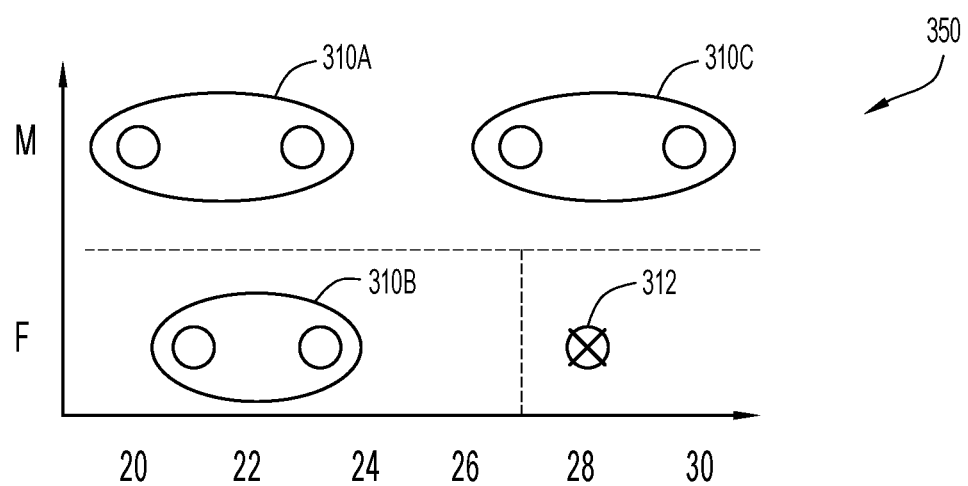

FIG. 3A depicts an example of a specific-purpose dataset 300, and FIGS. 3B-3D depict examples of a multidimensional model 350. As depicted, specific-purpose dataset 300 includes data records with an age field 302 and a gender field 304. Specific-purpose dataset 300 may be populated by records that are provided by entities who consented to the use of their personal data for one or more specific purposes.

FIG. 3B depicts multidimensional model 350 including records migrated from specific-purpose dataset 300. A multidimensional model may use any quasi-identifiers as dimensions in order to arrange records; as depicted, multidimensional model 350 is a two-dimensional model with the quasi-identifiers of "age" and "gender" selected for its dimensions. Clusters of records, such as clusters 306A-306C, may be identified by ROI module 160.

FIG. 3C depicts multidimensional model 350 with partitions made to separate a dataset into regions of interestingness, such as regions of interestingness 308A-308C. In some embodiments, ROI module 160 partitions the dataset into the regions of interestingness according to the clustering of records. For example, the dataset is partitioned such that region of interestingness 308A contains cluster 306A, region of interestingness 308B contains cluster 306B, and region of interestingness 308C contains cluster 306C.

FIG. 3D depicts data records from the general-purpose dataset fitted into the partitioned multidimensional model 350. A subset of data records from the general-purpose data (e.g., record clusters 310A, 310B, 310C, and record 312) are selected because they fall into one of the regions of interestingness 308A, 308B, or 308C. Some records may be removed even though they fit within a region of interestingness. For example, record 312 may be removed because a single record cannot be de-identified without other records being in the same region of interestingness. The remaining records from the general-purpose dataset are then de-identified inside of each partition. For example, instead of de-identifying all of the records together, records in record cluster 310A are de-identified together with records in record cluster 310C, but not with records in record cluster 310B (which are de-identified among themselves only). Once de-identified, the records are combined with the specific-purpose records in order to generate an augmented dataset.

Figure 4A:
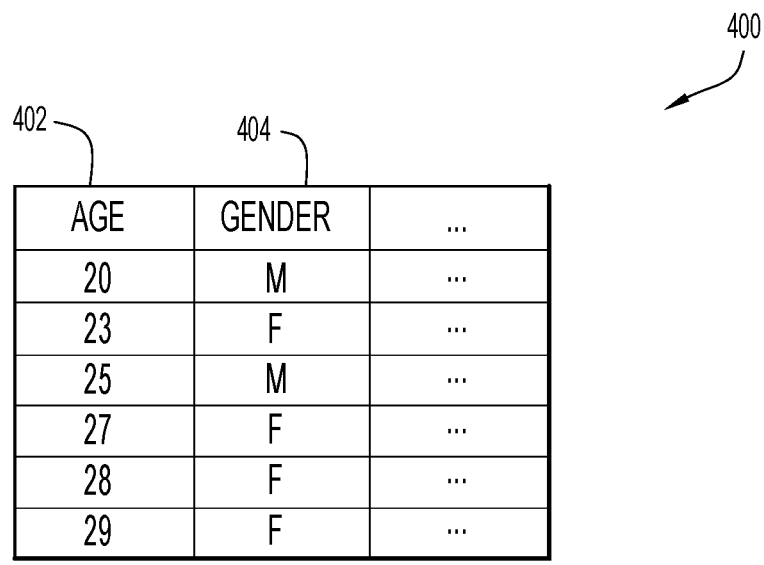
FIG. 4A-4D illustrate further examples of dataset generation in accordance with an embodiment of the present invention.
Figure 4B:
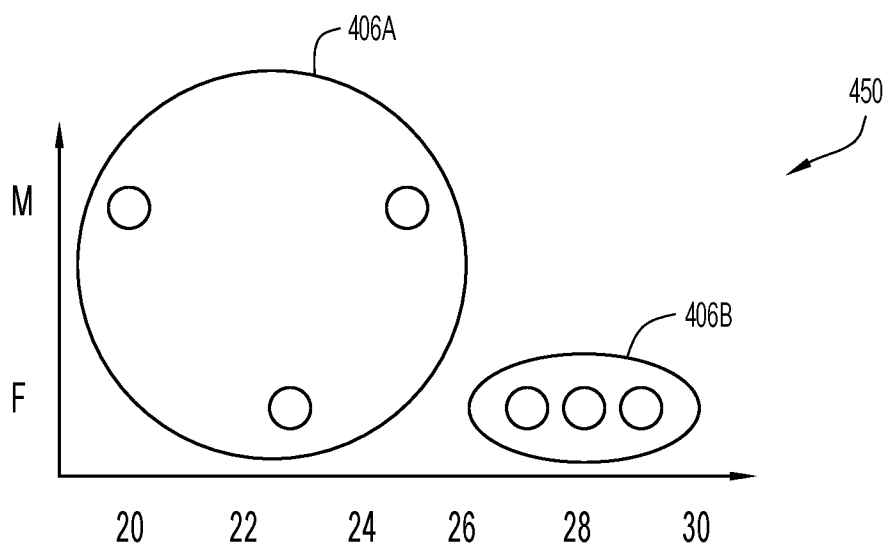
Figure 4C:
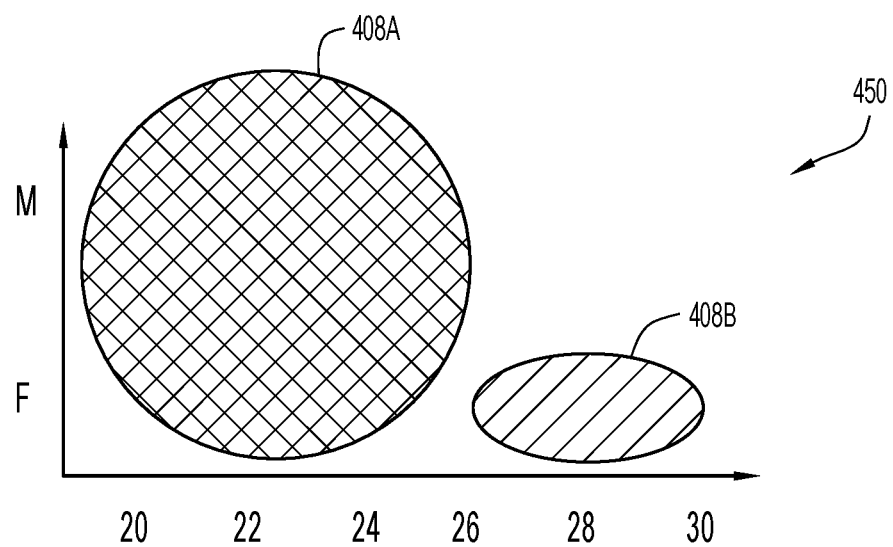
Figure 4D:
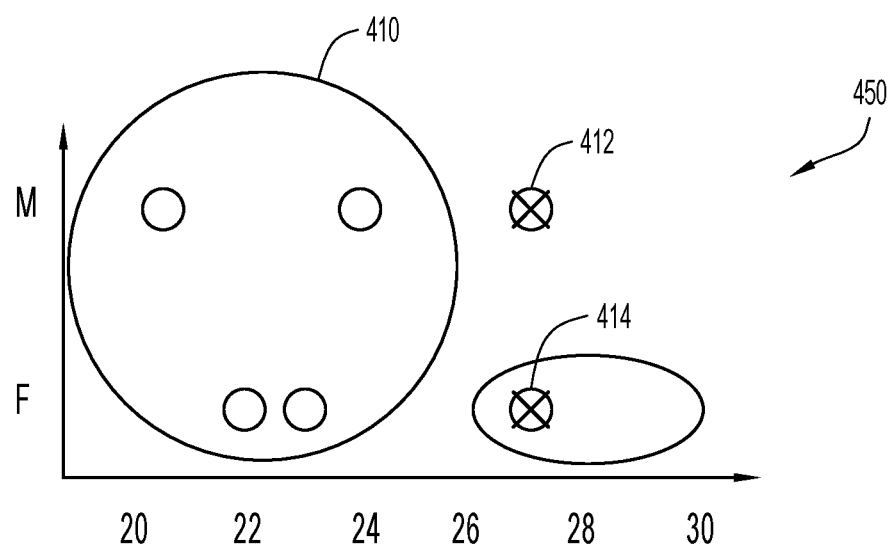

FIGS. 4A-4D illustrate another example of dataset generation in accordance with an embodiment of the present invention. FIG. 4A depicts an example of a specific-purpose dataset 400, and FIGS. 4B-4D depict examples of a multidimensional model 450. As depicted, specific-purpose dataset 400 includes data records with an age field 402 and a gender field 404. Specific-purpose dataset 400 may be populated by records that are provided by entities who consented to the use of their personal data for one or more specific purposes.

FIG. 4B depicts multidimensional model 450 including records migrated from specific-purpose dataset 400. A multidimensional model may use any quasi-identifiers as dimensions in order to arrange records. As depicted, multidimensional model 450 is a two-dimensional model that is substantially similar to multidimensional model 350, with the quasi-identifiers of "age" and "gender" selected for its dimensions. Clusters of records, such as clusters 406A and 406B, may be identified by ROI module 160.

FIG. 4C depicts multidimensional model 450 with partitions made to separate a dataset into regions of interestingness, such as regions of interestingness 408A and 408B. In some embodiments, ROI module 160 partitions the dataset into the regions of interestingness according to the clustering of records. For example, the dataset is partitioned along the bounds of each cluster 406A and 406B such that region of interestingness 408A encompasses the records of cluster 406A and region of interestingness 408B encompasses the records of cluster 406B. ROI module 160 may partition a dataset into regions of interestingness in order to support a particular study. For example, if a longitudinal study is researching the effects of a medication over time, ROI module 160 may partition a dataset into regions of interestingness that correspond to three-year age intervals for individuals (e.g., 18 years old to 21 years old, 21 years old to 24 years old, etc.).

FIG. 4D depicts data records from the general-purpose dataset fitted into the partitioned multidimensional model 450. A subset of data records from the general-purpose data (e.g., record cluster 410 and records 412 and 414) are selected because they fall into one of the regions of interestingness 408A or 408B. Some records may be removed even though the records fit within a region of interestingness. For example, record 414 may be removed because a single record cannot be de-identified when there are no other records of non-consented entities within the same region of interestingness. Such de-identification would cause harm to some of the consented records which would have to be generalized, thereby losing their utility level in exchange for supporting the study, while effectively concealing the identity of the non-consented individual/record. Record 412 may be removed because it does not fall within any region of interestingness. If record 412 remained in the data, it would have to be de-identified and this would have to happen with the presence of other data records belonging to the same region of interestingness, thereby leading to an extension of the region of interestingness at the expense of data utility. The remaining records from the general-purpose dataset are then de-identified inside of each partition. For example, records in record cluster 410A are de-identified together. Once de-identified, the records are combined with the specific-purpose records in order to generate an augmented dataset.

Figure 5:
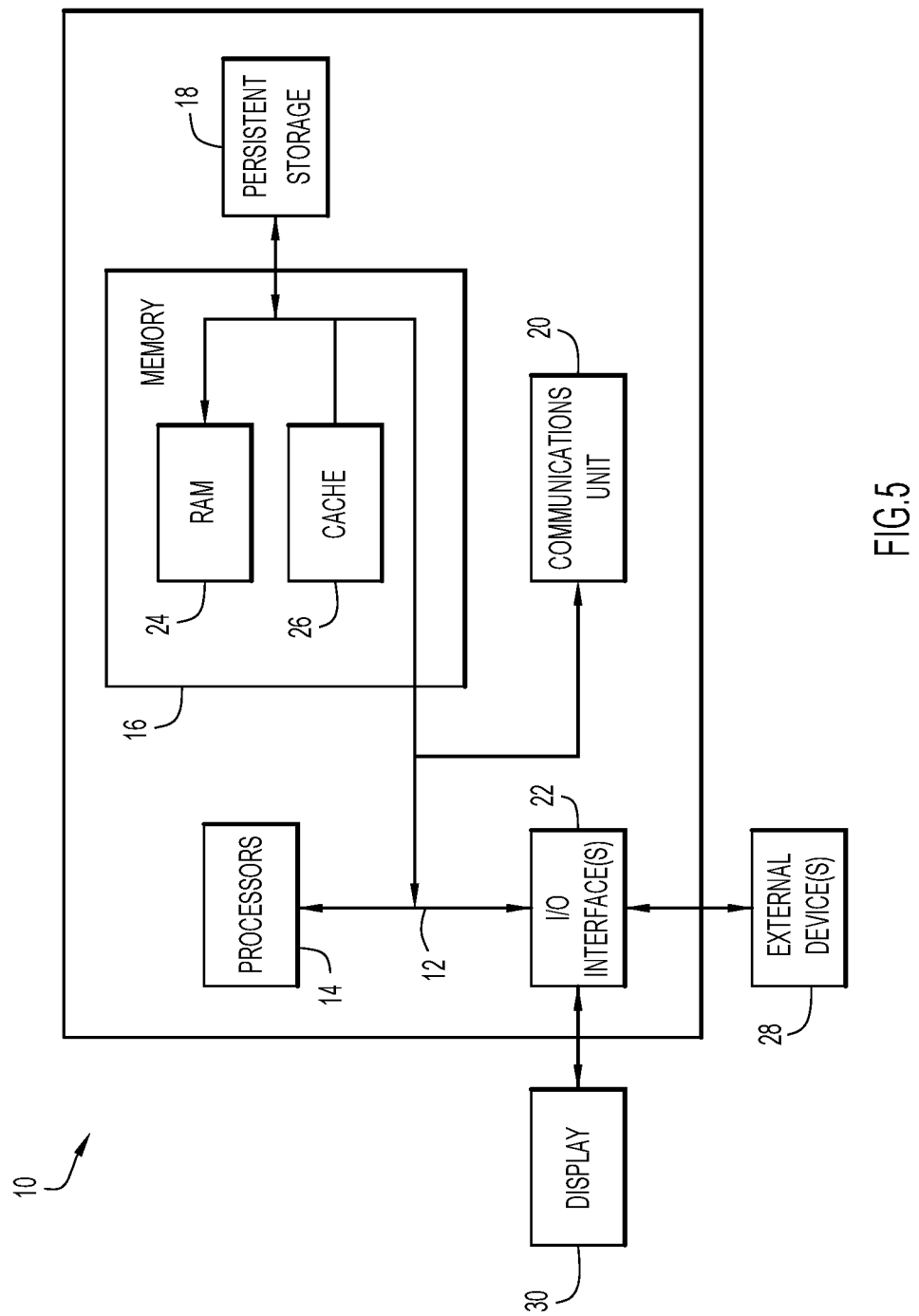
FIG. 5 is a block diagram depicting a computing device in accordance with an embodiment of the present invention.

FIG. 5 is a block diagram depicting components of a computer 10 suitable for executing the methods disclosed herein. Computer 10 may implement server 140 to augment a dataset using de-identified data in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data in any dataset (e.g., a dataset composed of data records provided for a specific research purpose, a dataset composed of data records that can be used for any purpose once de-identified, or an augmented dataset), whether de-identified not, may be stored within any conventional or other data structures (e.g., files, arrays, lists, stacks, queues, records, etc.) and may be stored in any desired storage unit (e.g., database, data or other repositories, queue, etc.) The data transmitted between data lake 105, data mart 120, and server 140 may include any desired format and arrangement, and may include any quantity of any types of fields of any size to store the data. The definition and data model for any datasets may indicate the overall structure in any desired fashion (e.g., computer-related languages, graphical representation, listing, etc.).

Data in a dataset, such as a general-purpose dataset, specific-purpose dataset, or augmented dataset, may include any information provided to data lake 105, data mart 120, and/or server 140. Data in a dataset may include any desired format and arrangement, and may include any quantity of any types of fields of any size to store any desired data. The fields may indicate the presence, absence, actual values, or any other desired characteristics of the data of interest (e.g., quantity, value ranges, etc.). Data in a dataset may include all or any desired portion (e.g., any quantity of specific fields) of personal information (PI) or other data of interest within a given implementation or system. Data in a dataset may indicate the overall structure in any desired fashion (e.g., computer-related languages, graphical representation, listing, etc.). The fields for each data record in the dataset may be selected automatically (e.g., based on metadata, common or pre-defined models or structures, etc.) or manually (e.g., pre-defined, supplied by a data owner, etc.) in any desired fashion for a particular implementation or system. Metadata (e.g., for field selection, permitted uses for specific-purpose data records, etc.) may include any suitable information providing a description of fields or information (e.g., description of content, data type, etc.).

The data records in a dataset may include any data collected about entities by any collection mechanism, any combination of collected information, any information derived from analyzing collected information, and any combination data before or after de-identification.

The present invention embodiments may employ any number of any type of user interface (e.g., Graphical User Interface (GUI), command-line, prompt, etc.) for obtaining or providing information (e.g., data in a dataset), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for generation and analysis of various types of data, even in the absence of that data. For example, present invention embodiments may be utilized for any types of data interest (e.g., sensitive data (personal information (PI) including information pertaining to patients, customers, suppliers, citizens, and/or employees, etc.) non-sensitive data, data that may become unavailable (e.g., data that is subject to deletion after retention for a minimum time interval (e.g., information subject to various regulations, etc.), information that becomes unavailable due to system outage, power failure, or other data loss, etc.), etc.). Further, present invention embodiments may generate and utilize any quantity of data regarding entities of interest.

It will be appreciated that the embodiments described above and illustrated in the drawings represent only a few of the many ways of augmenting a dataset using de-identified data.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., server software, communication software, database software, ROI module 160, data relevancy module 165, de-identification module 170) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, communication software, database software, ROI module 160, data relevancy module 165, de-identification module 170) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data in a dataset). The database system may be implemented by any number of any conventional or other databases, data stores or storage structures (e.g., files, databases, data structures, data or other repositories, etc.) to store information (e.g., data in a dataset). The database system may be included within or coupled to the server and/or client systems. The database systems and/or storage structures may be remote from or local to the computer or other processing systems, and may store any desired data (e.g., data in a dataset).

The present invention embodiments may employ any number of any type of user interface (e.g., Graphical User Interface (GUI), command-line, prompt, etc.) for obtaining or providing information (e.g., data in a dataset), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, in a data processing system comprising at least one processor and at least one memory, the at least one memory comprising instructions executed by the at least one processor to cause the at least one processor to utilize a dataset for supporting a research study, the method comprising:
    determining one or more regions of interestingness within a model of data records of a first dataset, wherein the data records of the first dataset are authorized for the research study by associated entities and are not subject to de-identification requirements, wherein the model includes dimensions of quasi-identifiers, and wherein each data record of the first dataset is represented according to values of the quasi-identifiers of the data record;

representing within the model data records from a second dataset, wherein the data records from the second dataset are relevant for supporting objectives of the research study, correspond to entities other than those associated with the first dataset, and are authorized for the research study by associated entities after transformation to satisfy the de-identification requirements, and wherein each data record of the second dataset is represented in the model according to values of the quasi-identifiers of the data record;

removing data records of the second dataset from the one or more regions of interestingness based on those records failing to satisfy the de-identification requirements;

generating a resulting dataset for the research study including the data records of the first dataset within a selected region of interestingness and selected data records of the second dataset, wherein the selected region of interestingness corresponds to a cluster of data records of the first dataset that is identified based on the values of the quasi-identifiers of the data records of the first dataset, and wherein the selected data records of the second dataset are selected based on the values of the quasi-identifiers of the selected data records being within the selected region of interestingness; and de-identifying the data records of the second dataset within the resulting dataset based on the de-identification requirements.

2. The method of claim 1, wherein generating a resulting dataset further comprises:

identifying data records of the second dataset within the selected region of interestingness that are similar to data records of the first dataset; and generating the resulting dataset with the identified data records of the second dataset.

3. The method of claim 1, wherein the data records from the second data set that are relevant for supporting objectives of the research comprise data records from the second data set that fit within a region of interestingness.

4. The method of claim 1, wherein the data records of the second dataset are de-identified in separate groups corresponding to each of the one or more regions of interestingness.

5. The method of claim 1, wherein each region of interestingness is identified by analyzing the data records from the first dataset to find clusters of records.

6. The method of claim 1, wherein each data record of the first dataset includes one or more of: a direct identifier, and a quasi-identifier.

* * * * *